(12) United States Patent
Rancourt

(10) Patent No.: US 6,386,107 B1
(45) Date of Patent: May 14, 2002

(54) VOICE BASED INTERFACE FOR A PRINTING PRESS

(75) Inventor: Michael Raymond Rancourt, Merrimack, NH (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/366,048

(22) Filed: Aug. 2, 1999

(51) Int. Cl.$^7$ .................. B41F 33/00; B41F 33/02; G10L 15/00; G10L 15/28; G06F 3/16
(52) U.S. Cl. ................ 101/484; 101/483; 704/275
(58) Field of Search ................. 101/483, 484; 704/275

(56) References Cited

U.S. PATENT DOCUMENTS

| | | | | |
|---|---|---|---|---|
| 4,215,370 A | * | 7/1980 | Kirk, Jr. ................ 358/146 |
| 4,812,842 A | | 3/1989 | Bayerlein et al. ...... 340/825.72 |
| 4,935,776 A | * | 6/1990 | Fukui ..................... 355/206 |
| 5,043,904 A | * | 8/1991 | Sikes et al. ............... 101/248 |
| 5,305,055 A | * | 4/1994 | Ebner et al. ................. 399/9 |
| 5,778,791 A | * | 7/1998 | Albus et al. .............. 101/483 |
| 5,873,046 A | * | 2/1999 | Bronner ................... 455/533 |
| 5,991,726 A | * | 11/1999 | Immarco et al. ........... 704/270 |

FOREIGN PATENT DOCUMENTS

| DE | 19715101 A | * | 10/1998 |
| JP | 54-65445 | * | 5/1979 |
| JP | 58-22234 A | * | 2/1983 |
| JP | 8-6748 | * | 1/1996 |
| JP | 9-91335 | * | 3/1997 |
| JP | 9-97146 | * | 4/1997 |
| JP | 11-102281 | * | 4/1999 |

\* cited by examiner

*Primary Examiner*—Daniel J. Colilla
(74) *Attorney, Agent, or Firm*—Burns, Doane, Swecker & Mathis, LLP

(57) ABSTRACT

The present invention is directed to providing a printing press interface which permits the operator to walk freely about the press during operation, and to input voice commands and to receive press status information as recognizable voice feedback. Exemplary embodiments permit the operator to initiate voice commands and to receive voice status information when the operator is located anywhere in a vicinity of the press. For example, the operator can communicate with the press via a wireless headset which transmits voice commands from the operator to the press, and which receives voice status information transmitted from the press.

11 Claims, 3 Drawing Sheets

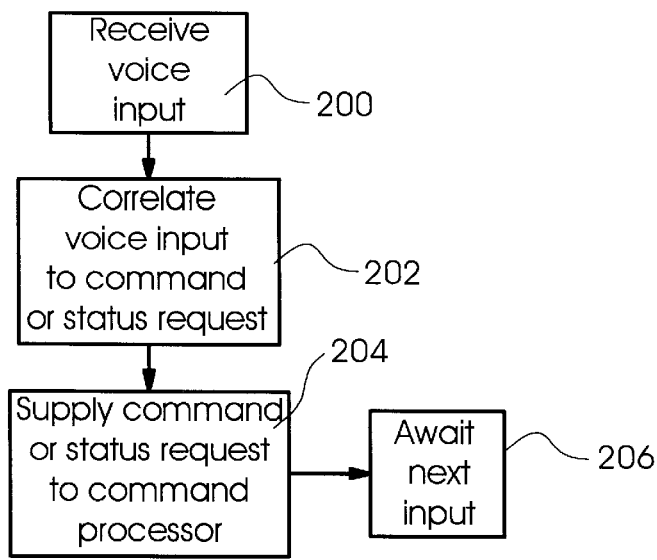
Fig. 2a
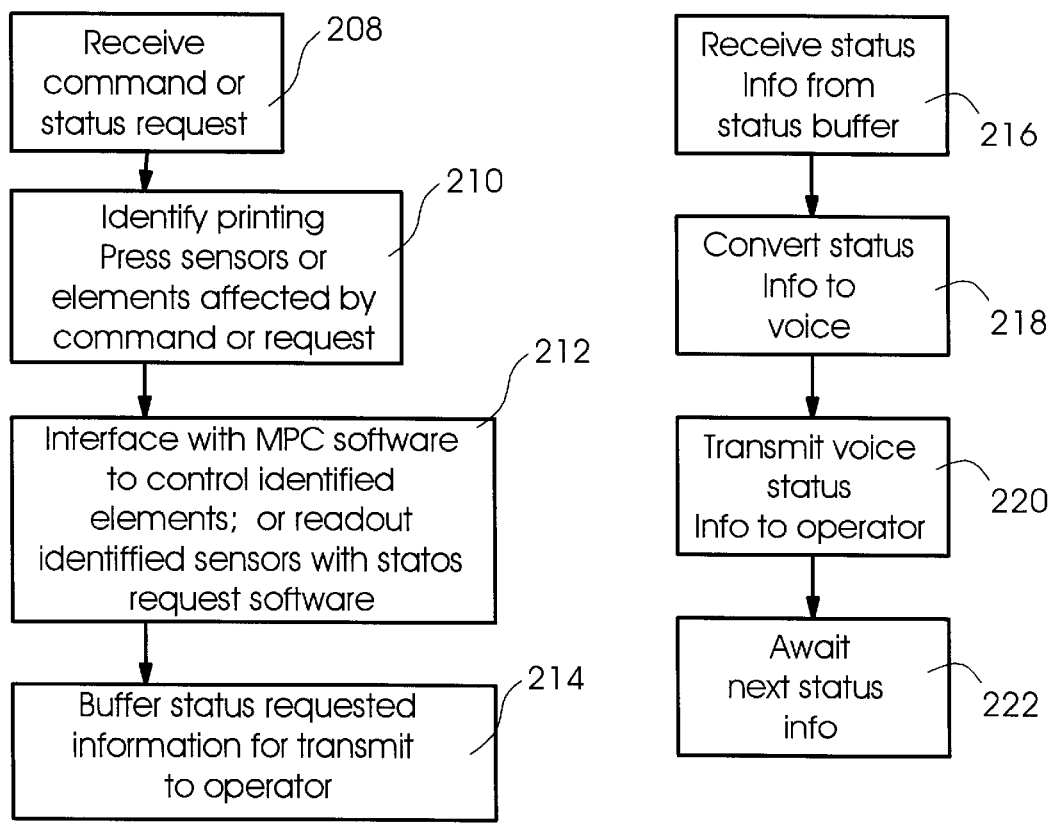
Fig. 2b
Fig. 2c

VOICE BASED INTERFACE FOR A PRINTING PRESS

BACKGROUND OF THE INVENTION

1. Field of the Invention

The present invention relates generally to the control of printing presses. More particularly, the present invention is directed to automated control of printing presses from remote locations via a voice based interface.

2. Background Information

Control of a conventional printing press is implemented using an interface configured as a control console, typically having a keyboard and display. The operator must be present at the control console, and use his hands to enter press control requests and to request specific status information from various locations within the press. In response to hand keyed control commands and requests, status information can be displayed at the console for viewing by the operator. Status information is typically provided to the control console via either a wired link or via a wireless (e.g., radio frequency, or RF) link.

As those skilled in the art will appreciate, the requirement that the operator be situated at a centralized control console location can be an impediment to efficient monitoring of press operation, particularly as the size of the press is increased. A typical web fed printing press can be quite large and can, for example, encompass an entire press room. This renders the monitoring of various locations in the press quite cumbersome because the press operator must return to the control console each time a particular point in the press is to be monitored following a visual inspection of the area. If a particular fault indication is displayed at the control console, the operator must walk from the control console to each specified area of the fault condition.

One attempt to address the cumbersome nature of controlling a press and monitoring press status information from a centralized control console area is described in U.S. Pat. No. 4,812,842. This patent is directed to a wireless control device for a printing machine. The control device includes a portable hand unit having a transmitter, and plural push buttons for selecting a desired command to be sent to one of plural electronic control units associated with a printing machine. The commands can be transmitted from the hand unit over a wireless link using, for example, electromagnetic radiation such as infrared waves, or by ultrasonic waves. A speech analysis system is generally described as being employed with the wireless control device to permit commands to be entered verbally by the operator. The verbal commands of the user are described as being converted into some digital format (e.g., infrared light pulses) to increase transfer assurance. In operation, the operator would presumably enunciate a particular command or status request which the hand unit would convert using, for example, pulse code modulation, into a signal which is transmitted to a control unit of the press. The control unit then activates the final control elements, such motors, valves and so forth, or provides the appropriate feedback indication. For example, relatively limited feedback information can be provided to the operator via acoustic warning alarms and so forth. Thus, the hand held unit does not transmit or receive voice per se, but rather the operator's voice is converted into a specific pulse code modulated signal, and only limited feedback is provided.

Accordingly, it would be desirable to provide a voice based interface for a printing press which can respond to a wide range of voice input from the operator, and which can provide status reporting in the form of voice feedback to the operator.

SUMMARY OF THE INVENTION

The present invention is directed to providing a printing press interface which permits the operator to walk freely about the press during operation, and to input voice commands and to receive press status information as recognizable voice feedback. Exemplary embodiments permit the operator to initiate voice commands and to receive voice status information when the operator is located anywhere in a vicinity of the press. For example, the operator can communicate with the press via a wireless headset which transmits voice commands from the operator to the press, and which receives voice status information transmitted from the press.

Generally speaking, exemplary embodiments are directed to an apparatus for interfacing with a printing press comprising: means for monitoring status conditions of a printing press; and means for generating audible indications of said status conditions as voice outputs.

BRIEF DESCRIPTION OF THE DRAWINGS

Other objects and advantages of the present invention will become more apparent to those skilled in the art upon reading the detailed description of the preferred embodiments, wherein like elements have been designated by like numerals, and wherein:

FIGS. 2A–2C illustrate exemplary flow charts in accordance with operation of the FIG. 1 interface.

DETAILED DESCRIPTION OF THE PREFERRED EMBODIMENTS

Figure 1:
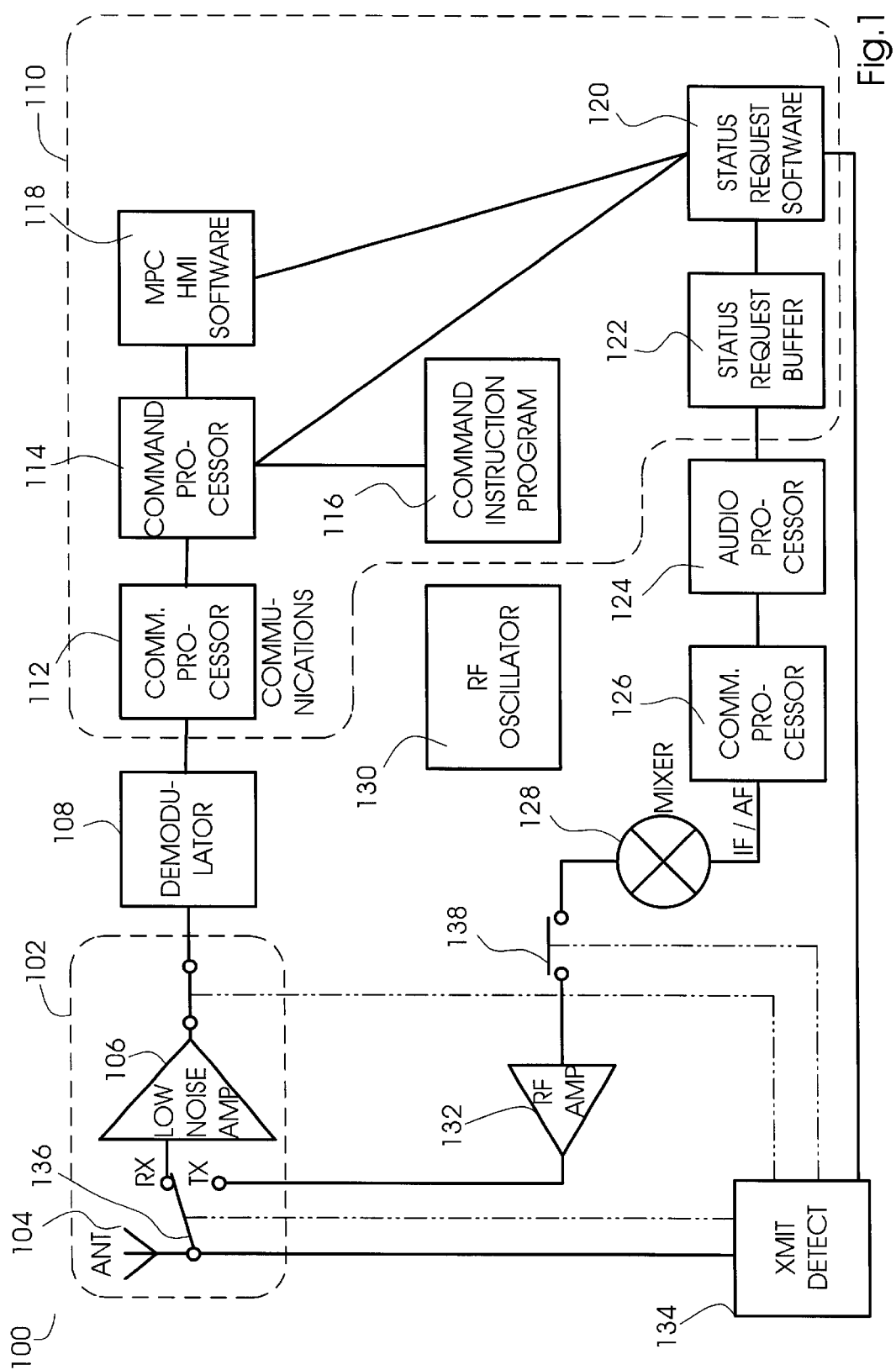
FIG. 1 is an exemplary embodiment of the voice activated machine interface for the main press console of a printing press.

FIG. 1 illustrates an exemplary apparatus for interfacing with a printing press in accordance with the present invention is generally designated 100. The apparatus for interfacing is included within a main press console (MPC). The main press console interface 100 includes an input means 102 for receiving voice commands over a wireless link from the operator. In the exemplary FIG. 1 embodiment, the input means 102 includes an antenna 104, such as a radio frequency antenna, and a low noise amplifier 106 for amplifying the received signals. Where voice inputs of the user transmitted over the wireless link have been modulated before transmission in any conventional manner, such as by frequency modulation or amplitude modulation and so forth, the input is supplied to a demodulator 108 for demodulation in a conventional manner. The voice input can be transmitted over the wireless link using any frequency, such as radio frequencies and radio frequency carriers on the order of a 1 megahertz (MHz) up to $10^{10}$ Hz or greater.

The demodulated voice inputs are supplied to a means for monitoring status conditions of a printing press, generally represented as the monitoring means 110. In the exemplary FIG. 1 embodiment, the monitoring means 110 is configured to include a communications processor 112, and a command processor 114. The communications processor can include any conventional speech processing algorithm to perform voice recognition on the received input signal. For example, where the operator has requested a status report of web tears in a web fed rotary printing press, the communications processor can be configured to recognize an operator voice command such as "monitor web break". The recognized voice command can be output from the communications processor 112 to the command processor 114.

FIG. 2A shows an exemplary flow chart associated with the communications processor 112. In block 200, voice inputs (commands or status requests) from the user which have been transmitted over the wireless link and demodulated by demodulator 108 are received. In block 202, the communications processor uses a stored, conventional speech processing algorithm, such as the ViaVoice™ voice recognition software available from IBM, to interpret the voice input, and to correlate the voice input to a specific command or status request. For example, the communications processor can perform voice recognition of predetermined key words. In block 204, the specific command or status request is forwarded to the command processor 114. The communications processor then returns to an inactive state to await the next voice input, as represented by block 206.

The command processor 114 can be configured to operate in accordance with a command instruction program retained in a memory 116. The command processor 114 can also interface with conventional main press console machine interface software, associated with the printing press, and stored in a memory 118. The main press console machine interface software can be conventional software used to drive any given printing press including, but not limited to, the graphical user machine interface software associated with the Heidelberg M3000 Printing Press as described in the M3000 Printing Press Operating Manual available from Heidelberger Druckmaschinen and incorporated herein by reference.

In response to receiving a recognized voice command via the communications processor 112, the command processor 114 operates in accordance with the command instruction program to interface with the main press console machine interface software to control elements of the press affected by the command (for example, to control an adjusting motor of the press). The monitoring means 110 also includes status request software stored in a memory 120. The command processor interfaces with the status request software. The status request software acquires status information associated with the status request from the press (for example, from specified sensors, such as web tear sensors or any other sensor). Status information which has been acquired is stored in a status request buffer 122 for transmission to the operator.

FIG. 2B illustrates an exemplary flow chart of the operation associated with the command processor 114. In block 208, the command processor receives an interpreted voice input from the communications processor 112. In block 210, the command processor accesses the command instruction program 116, which constitutes an operating system for the command processor, to identify the specific printing press sensors or control elements affected by the command or request. For this purpose, the command processor can include a look-up table that correlates a specific command or status request to specific elements or sensors included in the press. After the specific press elements or sensors that are affected by the press have been identified in block 210, the command processor interfaces with the main press console software, which controls identified elements associated with a particular command. For example, where the command is a press start command, the command processor forwards this to the main press console software, such that the software can operate in known fashion to start up the press. Where the command processor has identified a voice input as a status request, the command processor identifies the appropriate sensors affected by that request, and forwards this information to the status request software in block 212.

The status request software then operates in known fashion to access the outputs of specific sensors located throughout the press. Any outputs monitored can have their status buffered in block 214, using the status request buffer 122 of FIG. 1. For example, the command processor can direct a status request to "monitor web breaks" to the appropriate sensors using the status request software 120. Any status information regarding web breaks acquired can then be stored in the status request buffer 122 of the monitoring means 110 for transmission back to the operator.

Transmission back to the operator is performed via a means for generating audio indications of the status conditions as voice outputs. In the exemplary FIG. 1 embodiment, audio indications are generated by converting status information which has been buffered in the status request buffer 122 into voice representations via an off-the-shelf audio processor 124. That is, status information received from the press can be placed into a predetermined format, such that it can be recognized by the audio processor and translated, for example, using a look-up table that translates the predetermined format into a predetermined voice output. The audio processor translates given status information to predetermined voice information under the control of a communications processor 126.

FIG. 2C illustrates an exemplary flow chart of the operation of the communications processor 126. In block 216, status information previously stored in the buffer 122 is received by the audio processor for translation into voice under the control of the communications processor 126. The communications processor converts the status information into voice using, for example, a look-up table stored in the audio processor, as represented by block 218. In block 220, voice status information is transmitted under the control of the communications processor 126 to the operator. The communications processor then awaits the next packet of status information from the buffer 122, as represented by block 222.

Those skilled in the art will appreciate that the communications processor 126, the communications processor 112, and the command processor 114 can be implemented as separate computers or microprocessors such as those available from Motorola Corp., Intel Corp. (e.g., Pentium ④ processor), AMD Corp., or Cyrix (e.g., X86 processors) operating in parallel, or their functionality can be combined into a single computer or microprocessor.

Voice outputs from the audio processor are mixed in a mixer 128 with the output of an oscillator, such as a radio frequency oscillator 130 under control of the communications processor 126. The input to the mixer 128 from the communication processor 126 can be in any desired format, including, but not limited to, an intermediate frequency, or directly as an audio frequency. An output from the mixer 128 is supplied via an output amplifier 130, represented in FIG. 1 as a radio frequency amplifiers 132, to the antenna 104 for transmission back to the operator.

In accordance with exemplary embodiments, the main press console interface 100 of FIG. 1 operates in a half duplex mode of operation. That is, the interface 100 is either active to receive voice inputs from the operator, or alternately is active to transmit voice status information back to the operator. For this reason, the exemplary FIG. 1 embodiment includes a transmit detect capability, well known to those skilled in the art, represented by a transmit detect element 134, such as the VS1 voice actived switch available from Ramsey Inc. of Ontario, Canada. The transmit detect element 134 operates in conjunction with switches 136 and 138 to transition the interface 100 from a default receive mode, to a transmit mode.

All of the structural features illustrated in the exemplary FIG. 1 embodiment can be implemented using conventional, off-the-shelf components configured to function in accordance with the exemplary embodiments described herein.

As already mentioned, voice commands from the operator are received over a wireless link by the antenna 104. Status information, represented as voice outputs, are supplied back to the operator via the same wireless link. Accordingly, it is necessary for the operator to have some means for remotely accessing the monitoring means, to configure the monitoring means to select status conditions to be monitored. In addition, the operator must have some mechanism for receiving the modulated status outputs sent over the wireless link from the antenna 104.

Figure 3:
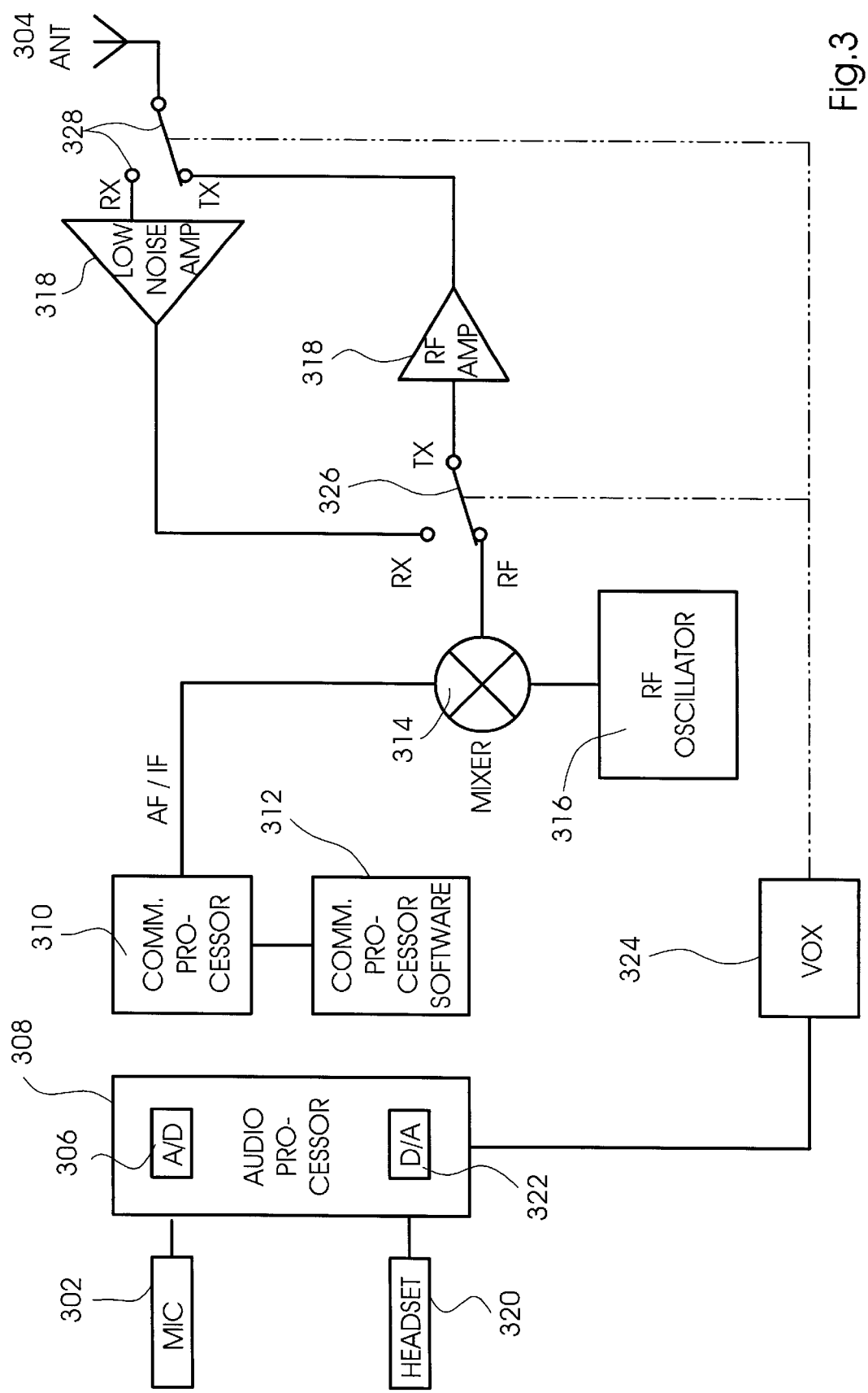
FIG. 3 illustrates an exemplary embodiment of a remote operator headset which can be worn by the operator, and used to interface with the main press console.

Referring to FIG. 3, an exemplary remote operator headset device 300 is illustrated for remotely configuring and controlling the monitoring means of FIG. 1. In the exemplary FIG. 3 remote operator headset device, voice commands issued by the operator are picked up by a microphone 302. The analog voice input received by the microphone 302 can, of course, be directly transmitted via an antenna 304 of the remote operator headset device to the main press console interface 100 via the wireless link. However, in accordance with an alternate embodiment, the voice commands are processed into a digital format via a conventional analog-to-digital converter 306 of an optional audio processor 308. The digitized voice commands are then processed under the control of a communications processor 310, which is programmed in accordance with communications processor software stored in a memory 312. For example, the communications processor controls modulation of the voice commands for transmission over the wireless link in a manner similar to that described with respect to the communications processor 126 of FIG. 1.

That is, in accordance with exemplary embodiments, voice commands can be frequency modulated, amplitude modulated, or any other form of modulation can be used to produce either an intermediate frequency or a direct audio frequency for output over the wireless link. The output from the communications processor 310 is supplied to a mixer 314 wherein it is mixed with an output of an oscillator 316, such as a radio frequency operator. The mixed output is then supplied through an amplifier 318 to the antenna 304 for transmission over the wireless link.

Those skilled in the art will appreciate that because audio frequency, voice commands or status requests of the user can be directly transmitted over the wireless link, the communications processor 310 and communications processor software can also be eliminated.

Status information transmitted from the main press console interface 100 to the antenna 304 is supplied via a low noise amplifier 318 back through the mixer 314 for demodulation, under control of the communications processor 310, for output to the operator. A headset worn by the operator, such as the headset designated 320, can be an analog or a digital headset. Where the headset is digital, the audio processor 308 can include a digital-to-analog converter 322.

Again, like the main press console interface 100, the remote operator headset can be configured to operate in a half-duplex mode. A conventional voice operated switch 324 can be used to transition from a default receive mode into a transmit mode via the activation of switches 326 and 328 in known fashion.

Those skilled in the art will appreciate that any conventional headset can be used. For example, where frequency modulation is used, any conventional frequency modulation headset having a transmit/receive range suitable for use with printing presses of the size desired, can be used. In addition, those skilled in the art will appreciate that the commands to which the machine press console responds can be limited to specific key words, or can be configured in accordance with the key word set available with any conventional speech processing algorithm readily available off-the-shelf. By way of example, headsets available from Earmark, Inc. such as the Earmark Series 4S radio headset can be used.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for interfacing a printing press comprising:
   means for monitoring status conditions of a printing press;
   means for generating audible indications of said status conditions as voice outputs; and
   means for configuring said monitoring means to select said status conditions to be monitored;
   wherein said configuring means is responsive to voice inputs of a user.

2. Apparatus according to claim 1, comprising:
   means for transmitting said voice outputs to a remote location via a wireless communication path.

3. Apparatus according to claim 2, wherein said wireless communication path is a radio frequency path.

4. Apparatus according to claim 3, wherein said voice outputs are frequency modulated for transmission over said wireless communication path.

5. Apparatus according to claim 1, comprising:
   means for remotely controlling said configuring means via a wireless communication path.

6. Apparatus according to claim 5, wherein said means for remotely controlling includes:
   a microphone for receiving voice inputs of an operator; and
   a speaker for outputting said status conditions to the operator.

7. Method for interfacing with a printing press, comprising the steps of:
   monitoring status conditions of a printing press;
   generating audible indications of said status conditions as voice outputs; and
   configuring said printing press to select said status conditions to be monitored in response to voice inputs of a user.

8. Method according to claim 7, wherein said voice outputs are supplied to a remote location via a wireless communication path.

9. Method according to claim 7, wherein said wireless communication path is a radio frequency path.

10. Method according to claim 9, wherein said voice outputs are frequency modulated for transfer over said wireless communication path.

11. Method according to claim 7, comprising the step of:
    remotely controlling the configuring of said printing press via a wireless communication path.

* * * * *